United States Patent [19]
Phelps, III et al.

[11] Patent Number: 5,339,178
[45] Date of Patent: Aug. 16, 1994

[54] LCD ASSEMBLY WITH LIGHT PIPE HAVING LIGHTGUIDES EXTENDING FROM SURFACE TO SURFACE AND RETAINING MEANS INTEGRAL WITH THE LIGHTPIPE

[75] Inventors: William C. Phelps, III, Plantation; Dwayne A. Daggs, Sunrise; William H. Robertson, Jr., Plantation; Tyler D. Jensen, Sunrise, all of Fla.

[73] Assignee: Motorola, Inc., Schaumburg, Ill.

[21] Appl. No.: 33,926

[22] Filed: Mar. 19, 1993

[51] Int. Cl.[5] .................. G02F 1/1335; G02B 6/00
[52] U.S. Cl. .................... 359/42; 359/49; 385/901
[58] Field of Search ............ 359/49, 48, 42; 385/901

[56] References Cited

U.S. PATENT DOCUMENTS

| | | | |
|---|---|---|---|
| 4,486,760 | 12/1984 | Funada et al. | 359/42 |
| 4,630,895 | 12/1986 | Abdala, Jr. et al. | 359/49 |
| 4,714,983 | 12/1987 | Lang | 362/27 |
| 4,755,035 | 7/1988 | Kopish et al. | 359/49 |
| 4,915,479 | 4/1990 | Clarke | 359/49 |
| 4,929,062 | 5/1990 | Guzik et al. | 359/49 |
| 5,029,045 | 7/1991 | Sanai et al. | 359/49 |
| 5,181,130 | 1/1993 | Hubby, Jr. | 359/42 |

FOREIGN PATENT DOCUMENTS

| | | | |
|---|---|---|---|
| 1-195490 | 8/1989 | Japan | 359/49 |

OTHER PUBLICATIONS

Motorola, Technical Developments Article, "Low Profile LCD Retainer/Mount and Lightpipe" by Todd W. Roshitsh, vol. 11, pp. 60–62, Oct. 1990.

*Primary Examiner*—Anita P. Gross
*Attorney, Agent, or Firm*—Andrew S. Fuller

[57] ABSTRACT

A display system (100) includes a liquid crystal display (110), a lightpipe (130), and a support structure such as a printed circuit board (160). The lightpipe (130) has integrally formed retaining members (232) to secure the liquid crystal display (110), and integrally formed mounting members (346) to mount and secure the lightpipe (130) to the support structure (160). The liquid crystal display (110) mounts onto the lightpipe (130) and is secured by the retaining members (232). The lightpipe (130) mounts onto the support structure (160) and is secured by the mounting members (346).

19 Claims, 5 Drawing Sheets

LCD ASSEMBLY WITH LIGHT PIPE HAVING LIGHTGUIDES EXTENDING FROM SURFACE TO SURFACE AND RETAINING MEANS INTEGRAL WITH THE LIGHTPIPE

TECHNICAL FIELD

This invention relates in general to liquid crystal display assemblies.

BACKGROUND

The present invention is related to liquid crystal display (LCD) assemblies and the associated assembly process. Specifically, this invention addresses structural support for the LCD, back lighting for the LCD, and mounting of the LCD assembly to its housing or support. When the LCD assembly support is a printed circuit board, the invention provides a means for efficient manufacturing.

One traditional LCD assembly, as shown in FIG. 1, includes a lightpipe 20, a separate bezel 12 to secure the LCD 10 to the lightpipe 20, a light source 18, and a support structure 14. The lightpipe 20 provides a medium through which illumination is directed from a light source 18 towards the LCD 10 to provide back lighting, and the lightpipe 10 provides structural support for the LCD. Incandescent lamps or light emitting diodes are typical light sources for back lighting the LCD, and there is usually a requirement for uniform dispersion of the back light. The bezel 12 is used to secure the LCD 10 to the lightpipe 20, and tabs 22 located on the bezel 12 are used to mount the lightpipe 20 to a printed circuit board or other support structure 14. An elastomeric connector 24 or a heat seal connector (not shown) provides electrical connection to the LCD 10. The LCD assembly is controlled by display circuitry 16.

A LCD assembly design is not very valuable if it cannot be reliably manufactured. The twist tab operation associated with metal bezels is undesirable because of inherent problems with alignment, assembly time, and process reliability. Additionally, having a separate lightpipe and bezel necessitates some locational tolerance between the bezel and the lightpipe thus increasing the total height of the assembly.

Furthermore, the LCD assemblies described in the prior art do not lend themselves to automated manufacturing, or even simple hand assembly. Alignment problems can arise from positioning the LCD on the lightpipe to mounting the LCD assembly to its support. Where elastomeric connectors are used, controlling the compression range of the elastomeric connectors is essential. These and other related problems affect the quality, reliability, and manufacturability of LCD assemblies.

SUMMARY OF THE INVENTION

Briefly, according to the invention, a lightpipe includes integral retaining means to secure a LCD, and an integral mounting means used to mount the lightpipe onto a support structure.

The invention further includes a display assembly which comprises a LCD, a support structure such as a printed circuit board, and a lightpipe with integral retaining means to secure the LCD, and integral mounting means used to mount the lightpipe onto a support structure. The LCD is mounted on the lightpipe and secured by the retaining means and the LCD assembly mounts onto the support structure and secured by the mounting means.

DETAILED DESCRIPTION OF THE PREFERRED EMBODIMENT

Figure 1:
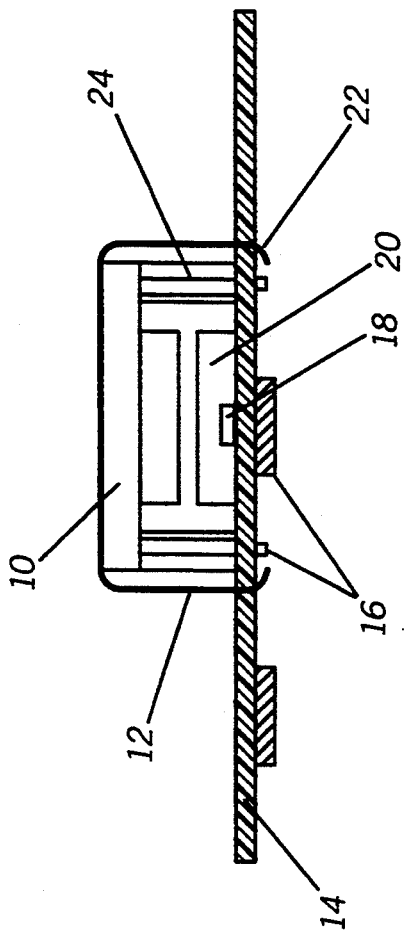
FIG. 1 is a prior art LCD assembly.

While the specification concludes with claims defining the features of the invention that are regarded as novel, it is believed that the invention will be better understood from a consideration of the following description in conjunction with the drawing figures, in which like reference numerals are carried forward.

Figure 2:
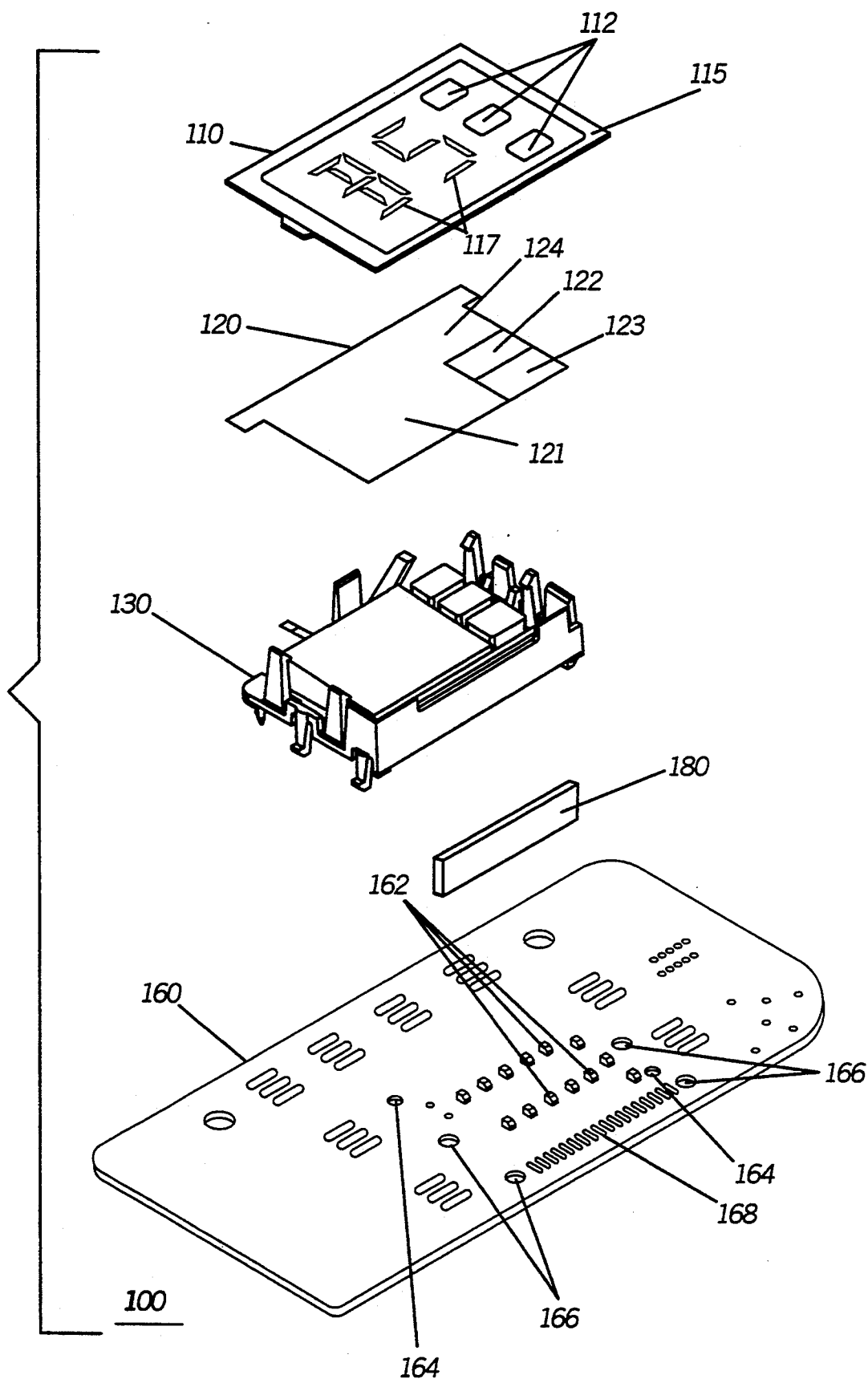
FIG. 2 is a an exploded perspective view of a LCD assembly in accordance with the present invention.

Referring now to FIG. 2, a LCD display assembly 100 is illustrated in an exploded assembly form. The assembly 100 has a LCD 110, a light filter 120, a lightpipe 130, an elastomeric connector 180, and a support structure such as a printed circuit board 160. Note that other support structures may be used instead of the printed circuit board. For example, the support structure may be a flexible circuit board. The description herein assumes a vertical orientation of the fully assembled components mentioned above, where the LCD 110 is on top and the printed circuit board 120 is on the bottom. This is simply for the purposes of this discussion and does not preclude a different orientation of the assembly.

Figure 3:
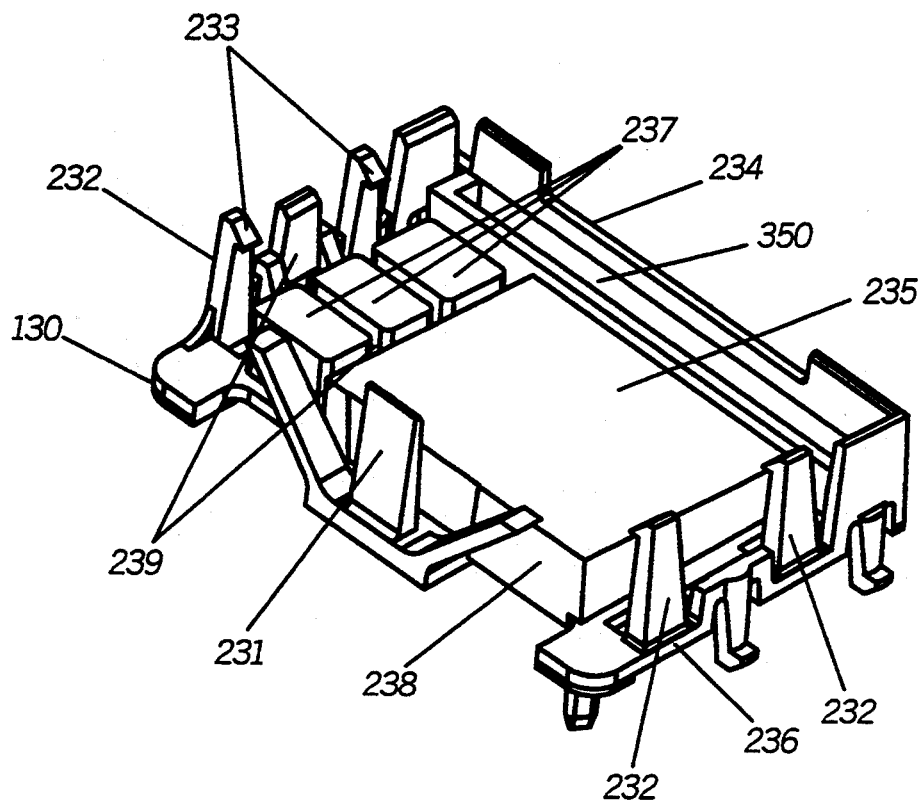
FIG. 3 is an isometric view of one angle of a lightpipe in accordance with the present invention.

Referring to FIG. 3, the lightpipe 130 is rectangular with a base portion 236, and a lightpipe portion 238. The lightpipe portion 238 is formed from a substantially transparent material such as clear plastic, and has an upper planar surface 235 and a lower planar surface 345. Located on the base portion 236 and extending up and beyond the upper planar surface 235 of the lightpipe 130 is a first integral retaining sidewall 231. Located opposite to the first retaining sidewall 231 is a second retaining sidewall 234, extending up from the upper planar surface 235. Integral LCD retaining cantilevers 232 extend from the base portion 236 up and beyond the upper planar surface 235. The LCD retaining cantilevers 232 exert a reactive force when deflected and are herein termed flexible. The LCD retaining cantilevers 232 are located on opposite sides of the periphery of the lightpipe 130 and are perpendicular to the retaining side walls 231,234. An internal cavity base 239 is formed from the extension of the LCD retaining cantilevers 232 and the retaining sidewalls 231,234, up and away from the upper planar surface 235, and this internal cavity 239 recieves both the light filter 120 and the LCD 110. The LCD retaining cantilevers 232 deflect out and away from the body of the lightpipe upon the application of vertical insertion force on the end portion of the cantilevers 233. Such force is present during the insertion of the LCD 110. The LCD retaining cantilevers 232 are flexible fingers with engaging ends or lips 233 protruding towards the body of the lightpipe 130 which secure the LCD 110 to the upper planar surface 235 of the lightpipe 130. The LCD retaining cantilevers 232, and the retaining sidewalls 231,234 are integral retaining means formed on the lightpipe portion 238 to secure the LCD 110 to the lightpipe portion 238.

Figure 4:
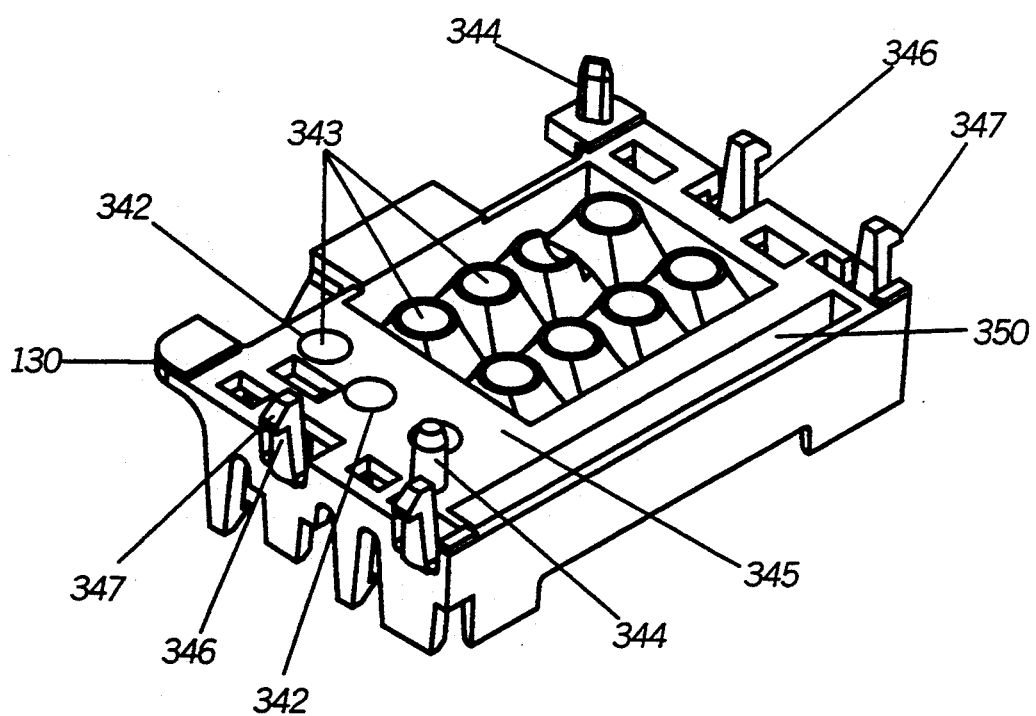
FIG. 4 is an isometric view of another angle of the lightpipe of FIG. 2.

FIG. 4 shows, from another angle, an isometric view of the lightpipe. The lightpipe 130 includes back lighting lightguides 340 and annuniciator lightguides 342 which are formed within the body of the lightpipe 130. These lightguides 340,342 originate on the lower planar surface 345 and extend towards the upper planar surface 235. The lightguides 340,342 have concave recesses 343 on the lower planar surface 348 to accommodate light sources such as light emitting diodes 162 shown on FIG. 2. Each lightguide 340 directs light from light sources 162 positioned below the lower planar surface 345 towards a specific area of the upper planar surface 235 of the lightpipe 130. The back lighting lightguides 340 are designed to provide uniform light dispersion for back lighting the LCD 110. Annunciator lightguides 342 direct light to the annunciator area 112 of the LCD 110. The housing for the lightguides 340,342 form the upper planar surface 235 of the lightpipe 130.

Integral mounting means are formed on the lightpipe portion 238 for mounting the lightpipe 130 to a support structure. Locating pins 344 originating on the lower planar surface 345 of lightpipe 130 extend away from the lower planar surface 345. These locating pins 344 are mounted into location slots 164 on the printed circuit board 160 as shown on FIG. 2. Integral mounting cantilevers 346 extend from the base portion 136 down and away from the lower planar surface 345 of the lightpipe 130. The mounting cantilevers 346 exert a reactive force when deflected and are herein termed flexible. These mounting cantilevers 346 are located on opposite ends of the lower planar surface 345 and mount into mounting slots 166 located on the printed circuit board 160 shown on FIG. 2. The mounting cantilevers 346 deflect in and towards the body of the lightpipe 130 upon the application of vertical insertion force on the end portion of the cantilevers 347. Such force is present during the insertion of the lightpipe 130 into the mounting slots 166 of the printed circuit board 160. The mounting cantilevers 346 are flexible fingers with engaging ends or lips 347 protruding away from the body of the lightpipe 130. These engaging ends or lips 347 secure the lightpipe 130 to the printed circuit board 160 with the lower planar surface 345 of the lightpipe 130 facing the printed circuit board 160.

As shown, the lightpipe 130 has a channel for housing an electrical connector 350 extending through the body of the lightpipe 130 extending from the lower planar surface 345 to the upper planar surface 235 parallel and adjacent to the retaining sidewall 234. This electrical connector channel 350 houses the elastomeric connector 180 which electrically connects the LCD 110 to the electrical source 168, both shown on FIG. 2. The elastomeric connector 180 is commonly known in the art as a zebra strip.

Referring back to FIG. 2, the LCD 110 is flat and planar and has a top surface 115 and a bottom surface (not shown). The LCD 110 shown has a two character display 117 and three annunciator segments 112. A user reads the LCD 110 viewed from the top surface 115. Receptacles for electrical connection (not shown) are located on the bottom surface (not shown).

Figure 5:
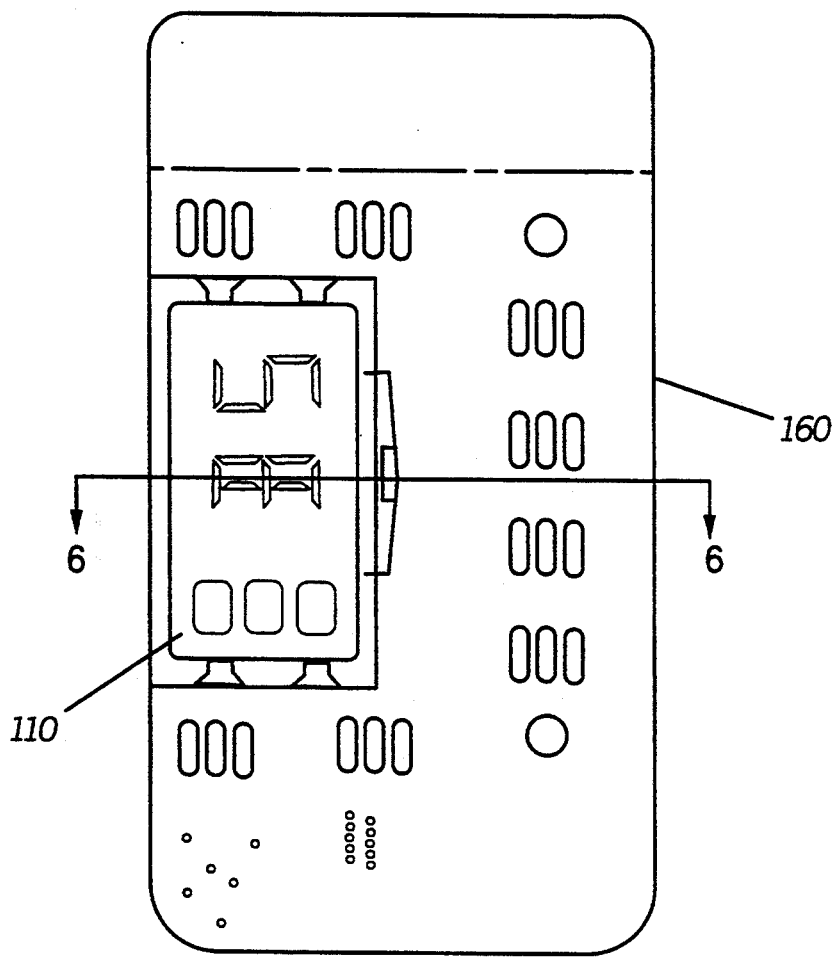
FIG. 5 is a LCD assembly in accordance with the present invention.
Figure 6:
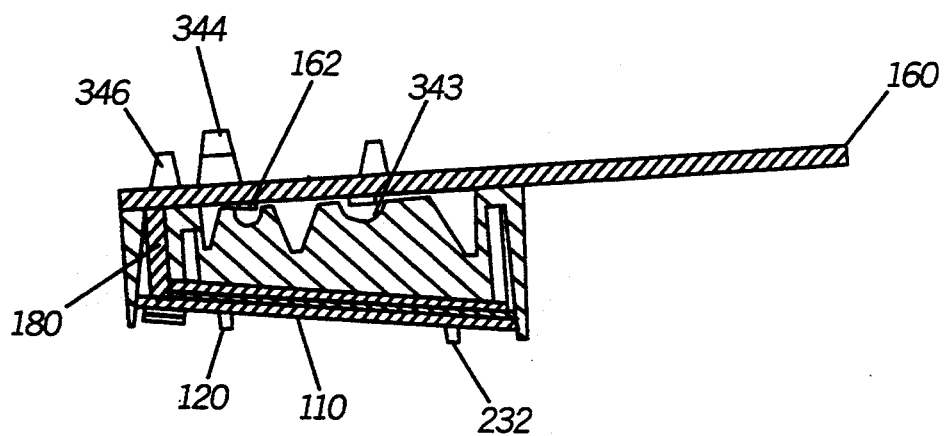
FIG. 6 is a cross-sectional view of FIG. 5.

To assemble, the elastomeric connector 180 is inserted into the electrical connector channel 350. The light filter 120 is mounted into the internal cavity 239 and onto the upper planar surface 235 such that the annunciator areas 122, 123, and 124, are positioned over the annunciator lightguide housings 237. The LCD 110 is positioned over the internal cavity 239 such that the annunciator area 112 is positioned over the light filter annunciator areas 122, 123, and 124, and between the retaining sidewalls 231, 234 and the retaining cantilevers 232. The LCD 110 is then mounted into the internal cavity 239 such that the engaging ends 233 of the retaining cantilevers 232 secure the LCD 110 in place, and such that the light filter is interposed between the LCD 110 and the lightpipe 130. The lightpipe 130 is positioned over the printed circuit board 160 using the locating pins 344 and is mounted into place by inserting the mounting cantilevers 346 into the mounting slots 166 on the printed circuit board 160. The full assembly is shown in FIG. 5 with a cross-section shown in FIG. 6.

Figure 7:
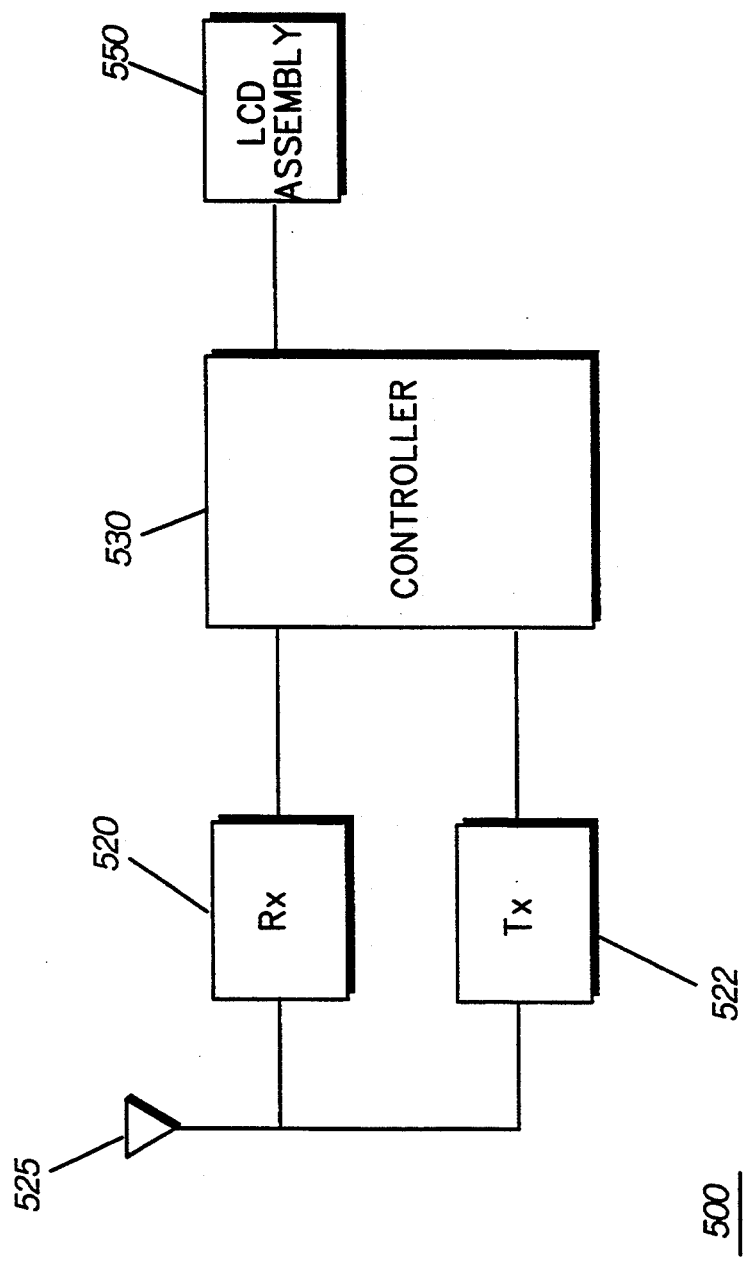
FIG. 7 is a block diagram of a radio 500 which incorporates the LCD assembly in accordance with the present invention.

In FIG. 7, the block diagram of a radio 500 which incorporates the LCD assembly 550 is shown. The LCD assembly 550 is made in accordance with the present invention. The controller 530 is programmed to control the LCD assembly 550 and the overall operation of the radio 500. The radio 500 communicates messages over a radio frequency channel using receiver 520, transmitter 522, and antenna 525.

The invention described herein addresses many of the problems found in the prior art. The lightguides 340, 343 provide improved uniform light dispersion over a controlled area of LCD 110. The number of parts for the LCD assembly is reduced by having integral LCD retaining cantilevers 232 and integral mounting cantilevers 346. The reduction of parts helps to reduce overall manufacturing costs. Manufacturing cost is also affected by labor costs. This invention reduces labor costs by easing the assembly operation. This invention is designed for simple assembly by using vertical insertion force to assemble each separate piece part. Thus, this invention simplifies the automation of the LCD assembly process.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

We claim:
1. A lightpipe for a liquid crystal display, comprising:
a lightpipe portion comprising a first surface and a second surface, and a plurality of lightguides originating on said first surface and extending toward said second surface, which directs light toward said second surface, and
retaining means integrally formed on said lightpipe portion for securing the liquid crystal display to said lightpipe portion.
2. A lightpipe for a liquid crystal display, comprising:
a lightpipe portion comprising a first surface and a second surface, and a plurality of lightguides originating on said first surface and extending toward said second surface, which directs light toward said second surface;

retaining means integrally formed on said lightpipe portion for securing the liquid crystal display to said lightpipe portion; and mounting means integrally formed on said lightpipe portion for mounting said lightpipe to a support structure.

3. A lightpipe for a liquid crystal display as defined in claim 2, wherein said lightpipe portion has a channel for housing an electrical connector.

4. A lightpipe for a liquid crystal display as defined in claim 2, wherein said lightpipe portion is formed from a substantially transparent material.

5. A lightpipe for a liquid crystal display as defined in claim 2, wherein said retaining means comprises flexible cantilevers.

6. A lightpipe for a liquid crystal display as defined in claim 5, wherein said flexible cantilevers comprises flexible fingers with engaging ends.

7. A lightpipe for a liquid crystal display as defined in claim 2, wherein said mounting means comprises flexible cantilevers.

8. A lightpipe for a liquid crystal display as defined in claim 7, wherein said flexible cantilevers comprises flexible fingers with engaging ends.

9. A lightpipe for a liquid crystal display, comprising;
a lightpipe portion, wherein said lightpipe portion has a upper planar surface and a lower planar surface, and said lightpipe portion has a plurality of lightguides originating on said lower planar surface and extending toward said upper planar surface, which directs light toward said upper planar surface;

retaining means integrally formed on said lightpipe portion for securing the liquid crystal display to said lightpipe portion; and mounting means integrally formed on said lighpipe portion for mounting said lightpipe to a support structure.

10. A lightpipe for a liquid crystal display as defined in claim 9, wherein said lightguides are formed within the body of said lightpipe and have concave recesses on said lower planar surface to accommodate light sources.

11. A lightpipe for a liquid crystal display, comprising:
a lightpipe portion;
retaining means integrally formed on said lightpipe portion for securing the liquid crystal display to said lightpipe portion;
mounting means integrally formed on said lightpipe portion for mounting said lightpipe to a support structure;
said lightpipe portion has a channel for housing an electrical connector;
said lightpipe portion is formed from a substantially transparent material;
said lightpipe portion has a upper planar surface and a lower planar surface;
said lightpipe portion has a plurality of lightguides originating on said lower planar surface and extending towards said upper planar surface, which directs light towards said upper planar surface;
said lightguides are formed within the body of said lightpipe and have concave recesses on said lower planar surface to accommodate light sources;
said retaining means comprises flexible cantilevers; and
said mounting means comprises flexible cantilevers.

12. A liquid crystal display assembly comprising:
a liquid crystal display;
a support structure;
a lightpipe mounted to said support structure, said lightpipe comprising retaining means integrally located on said lightpipe for securing said liquid crystal display to said lightpipe, said lightpipe further comprising mounting means integrally located on said lightpipe for mounting said lightpipe to said support structure, said lightpipe comprising a first surface and a second surface, and a plurality of lightguides originating on said first surface and extending toward said second surface, which directs light toward said second surface; and
wherein said liquid crystal display is mounted on said lightpipe.

13. A liquid crystal display assembly as defined in claim 12, wherein:
said lightpipe has a upper planar surface and a lower planar surface;
said liquid crystal display is mounted onto said upper planar surface of said lightpipe and secured by said retaining means; and
said lightpipe is mounted onto said support structure using said mounting means such that said lower planar surface faces said support structure.

14. A liquid crystal display assembly as defined in claim 13, further comprising locating means integrally attached to said lightpipe for orienting said lightpipe on said support structure.

15. A liquid crystal display assembly as defined in claim 12, wherein said lightpipe has an electrical connector housing channel.

16. A liquid crystal display assembly as defined in claim 15, further comprising:
an electrical source connected to said support structure;
an electrical connector; and
wherein said electrical connector is mounted through said electrical connector housing channel thereby connecting said liquid crystal display to said electrical source.

17. A liquid crystal display assembly as defined in claim 15, wherein said electrical connector comprises an elastomeric connector.

18. A liquid crystal display assembly comprising:
a liquid crystal display;
a support structure;
a lightpipe for mounting said liquid crystal display to said support structure;
retaining means integrally located on said lightpipe for securing said liquid crystal display to said lightpipe;
mounting means integrally located on said lightpipe for mounting said lightpipe to said support structure;
said lightpipe has a upper planar surface and a lower planar surface;
said liquid crystal display is mounted onto said upper planar surface of said lightpipe and secured by said retaining means;
said lightpipe is mounted onto said support structure using said mounting means such that said lower planar surface faces said support structure;
said lightpipe has lightguides originating on said lower planar surface and proceeding through said lightpipe towards said upper planar surface, said lightguides capable of directing light from said lower planar surface towards said upper planar surface;

said lightpipe has a channel for housing an electrical connector;

an electrical source connected to said support structure;

an electrical connector;

said electrical connector is mounted through said electrical connector housing channel thereby connecting said liquid crystal display;

said electrical connector comprises an elastomeric connector;

a light filter interposed between said liquid crystal display and said lightpipe; and locating means integrally attached to said lightpipe for orienting said lightpipe on said support structure.

19. A radio, comprising:

communication means for communication messages over a radio frequency channel;

a liquid crystal display;

a support structure;

a lightpipe mounted to said support structure;

said lightpipe comprising a first surface and a second surface, and a plurality of lightguides originating on said first surface and extending toward said second surface, which directs light toward said second surface;

said lightpipe comprising retaining means integrally located on said lightpipe for securing said liquid crystal display to said lightpipe;

said lightpipe further comprising mounting means integrally located on said lightpipe for mounting said lightpipe to said support structure; and wherein said liquid crystal display is mounted on said lightpipe.

* * * * *